(12) United States Patent
Begelfor et al.

(10) Patent No.: US 9,478,201 B1
(45) Date of Patent: Oct. 25, 2016

(54) SYSTEM AND METHOD FOR OPTICAL MUSIC RECOGNITION

(71) Applicant: TONARA LTD., Tel Aviv (IL)

(72) Inventors: Evgeni Begelfor, Holon (IL); Michael Zakai, Maale Adumim (IL); Ron Regev, Tel Aviv (IL)

(73) Assignee: TONARA LTD., Tel Aviv (IL)

( * ) Notice: Subject to any disclaimer, the term of this patent is extended or adjusted under 35 U.S.C. 154(b) by 0 days.

(21) Appl. No.: 15/027,248

(22) PCT Filed: Dec. 24, 2014

(86) PCT No.: PCT/IB2014/067306
§ 371 (c)(1),
(2) Date: Apr. 5, 2016

(87) PCT Pub. No.: WO2015/101908
PCT Pub. Date: Jul. 9, 2015

Related U.S. Application Data (60) Provisional application No. 61/922,140, filed on Dec. 31, 2013.

(51) Int. Cl.
*G10H 1/18* (2006.01)
*G10H 1/00* (2006.01)
*G10G 1/00* (2006.01)

(52) U.S. Cl.
CPC ............. *G10H 1/0033* (2013.01); *G10G 1/00* (2013.01); *G10H 1/18* (2013.01); *G10H 2210/051* (2013.01); *G10H 2210/071* (2013.01); *G10H 2210/081* (2013.01); *G10H 2220/455* (2013.01); *G10H 2250/015* (2013.01)

(58) Field of Classification Search
CPC ........................................................ G10H 1/18
USPC .................................. 84/609, 649; 382/190
See application file for complete search history.

(56) References Cited

U.S. PATENT DOCUMENTS

| | | | | |
|---|---|---|---|---|
| 5,773,741 A * | 6/1998 | Eller | .................... | G10H 1/0041 382/187 |
| 7,148,414 B2 * | 12/2006 | Kestenbaum | .......... | G09B 15/02 84/477 R |
| 7,314,994 B2 * | 1/2008 | Hull | ........................ | G10H 1/00 84/615 |
| 7,432,432 B2 * | 10/2008 | Li | ...................... | G06K 9/00416 84/470 R |
| 7,985,913 B2 * | 7/2011 | Machell | ................. | G09B 15/00 434/114 |
| 8,067,682 B2 * | 11/2011 | Fahn | ........................ | G06K 9/00 84/609 |
| 8,442,325 B2 * | 5/2013 | Hong | ................. | G06K 9/00449 382/100 |

(Continued)

*Primary Examiner* — David Warren
(74) *Attorney, Agent, or Firm* — D.Kligler IP Services Ltd.

(57) ABSTRACT

Music recognition is carried out by accepting a musical score of musical elements in a digital format, transforming the digital format into a composite musical data object that models the musical score, defining the key signatures in the composite musical data object probabilistically, computing start times to play musical elements in respective measures of the composite musical data object without regard to rhythmic values of other musical elements in the respective measures, and generating an output including the defined key signatures and computed start times.

19 Claims, 8 Drawing Sheets

(56) References Cited

U.S. PATENT DOCUMENTS

| | | | | |
|---|---|---|---|---|
| 8,660,678 B1* | 2/2014 | Lavi | ................ | G10H 1/0066 700/94 |
| 8,697,972 B2* | 4/2014 | Dripps | ................ | G09B 5/06 84/470 R |
| 8,779,268 B2* | 7/2014 | Serletic | ................ | G10H 1/0025 84/609 |
| 8,933,312 B2* | 1/2015 | Good | ................ | G09B 15/04 84/609 |
| 9,142,201 B2* | 9/2015 | Good | ................ | G09B 15/04 |
| 2004/0255755 A1* | 12/2004 | Kestenbaum | ................ | G09B 15/02 84/483.2 |
| 2005/0005760 A1* | 1/2005 | Hull | ................ | G10H 1/00 84/645 |
| 2006/0062462 A1* | 3/2006 | Li | ................ | G06K 9/222 382/186 |
| 2006/0150803 A1* | 7/2006 | Taub | ................ | G09B 15/023 84/616 |
| 2008/0307946 A1* | 12/2008 | Machell | ................ | G09B 15/00 84/477 R |
| 2009/0125799 A1* | 5/2009 | Kirby | ................ | G06F 17/30899 715/234 |
| 2010/0204813 A1* | 8/2010 | Taub | ................ | G10H 1/00 700/94 |
| 2010/0313737 A1* | 12/2010 | Fahn | ................ | G06K 9/00 84/477 R |
| 2011/0232461 A1* | 9/2011 | Taub | ................ | G10H 1/00 84/609 |
| 2013/0000466 A1* | 1/2013 | Taub | ................ | G10H 1/00 84/609 |
| 2013/0025437 A1* | 1/2013 | Serletic | ................ | G10H 1/0025 84/634 |
| 2013/0319209 A1* | 12/2013 | Good | ................ | G09B 15/04 84/483.2 |
| 2014/0033899 A1* | 2/2014 | Dripps | ................ | G09B 5/06 84/483.1 |
| 2015/0082972 A1* | 3/2015 | Good | ................ | G09B 15/04 84/483.2 |
| 2015/0348523 A1* | 12/2015 | Bisnauth | ................ | G09B 15/023 84/483.1 |
| 2016/0098977 A1* | 4/2016 | Maezawa | ................ | G10G 1/00 84/602 |
| 2016/0189694 A1* | 6/2016 | Cowan | ................ | G10G 1/00 84/477 R |

* cited by examiner

SYSTEM AND METHOD FOR OPTICAL MUSIC RECOGNITION

FIELD OF THE INVENTION

This invention relates generally to computerized processing of musical documents. More particularly, this invention relates to automatic analysis of sheet music.

BACKGROUND OF THE INVENTION

The meanings of certain acronyms and abbreviations used herein are given in Table 1.

TABLE 1

Acronyms and Abbreviations

| | |
|---|---|
| CPU | Central Processing Unit |
| HDD | Hard Disk Drive |
| HMM | Hidden Markov Model |
| OMR | Optical Music Recognition |

Optical music recognition (OMR) is a specialized form of optical mark recognition in which documentary features of musical scores are recognized and analyzed. A musical score is essentially a concisely encoded medium, whereby a composer attempts to communicate his/her concepts of a musical composition and his instructions on its performance.

One difficulty with OMR results from the fact that the conventions of musical scores, in contrast to modern data communications protocols, lack a rigorous specification in matters such as spacing and demarcation of sequences of elements. Indeed, composers sometimes inadvertently or intentionally violate score conventions. The consequences of such anomalies, while understandable and compensated by a skilled performer, nevertheless can confound the ability of OMR applications to reliably provide features enabled by a digital score, e.g., Midi playback, score-following, and clean annotations.

U.S. Pat. No. 8,067,682 to Chen-Shyurng et al, which is herein incorporated by reference, proposes a technique, wherein a music score is detected and at least one measure in the music score is obtained by searching bar lines, so as to plan a recognition order according to the position of each measure in the music score. Next, an image capturing apparatus is controlled to capture one of the measures according to the recognition order, and music information in the captured measure is recognized and outputted immediately. The method follows the recognition order to perform the steps of controlling the image apparatus repeatedly, recognizing the captured measure, and outputting the music information on the other measures until each of the measures has been processed.

SUMMARY OF THE INVENTION

Embodiments of the invention increase the quality of OMR by identifying ambiguous key signatures correctly and coping with anomalies in the score, e.g., failure to adhere to the stated meter in individual measures.

There is provided according to embodiments of the invention a method of music recognition, which is carried out by accepting a musical score of musical elements in a digital format, transforming the digital format into a composite musical data object that models the musical score, defining the key signatures in the composite musical data object probabilistically, computing start times to play musical elements in respective measures of the composite musical data object without regard to rhythmic values of other musical elements in the respective measures, and generating an output including the defined key signatures and computed start times.

According to an aspect of the method, defining the key signatures in the composite musical data object is performed by submitting presumptive key signatures for computation in a hidden Markov model.

According to still another aspect of the method, the hidden Markov model includes an initial probability matrix populated by probabilities that the composite musical data object begins with a particular key, and a transitional probability matrix populated by probabilities of a transition from one key to another key in the composite musical data object.

In yet another aspect of the method computing start times includes identifying anomalous rhythmic elements in the respective measures of the composite musical data object that are inconsistent with the rhythmic values of the other musical elements therein, and computing the start times of the anomalous rhythmic elements according to the coordinates of the anomalous rhythmic elements relative to the coordinates of the respective measures.

Yet another aspect of the method includes generating the digital format by optically scanning the musical score.

According to a further aspect of the method, transforming the digital format into a composite musical data object includes producing the musical score in a new digital format that is acceptable to a processor.

According to an additional aspect of the method, the musical elements comprise a plurality of chords has respective chord intervals and computing start times includes computing a union of the chord intervals.

Another aspect of the method includes computing a union of a plurality of unions of chord intervals and determining whether the unions are within a single measure.

One aspect of the method includes making a determination that the union of the chord intervals in one of the measures is less than a predetermined proportion of an expected duration of the one measure, and responsively to the determination reporting that the one measure is a candidate for a pick-up measure.

An additional aspect of the method includes executing the output as a musical performance.

Other embodiments of the invention provide computer software product for carrying out the above-described method.

BRIEF DESCRIPTION OF THE DRAWINGS

For a better understanding of the present invention, reference is made to the detailed description of embodiments, by way of example, which is to be read in conjunction with the following drawings, wherein like elements are given like reference numerals, and wherein.

DETAILED DESCRIPTION OF EMBODIMENTS

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Aspects of the present invention may be embodied in software programming code, which is typically maintained in permanent storage, such as a computer readable medium. In a client/server environment, such software programming code may be stored on a client or a server. The software programming code may be embodied on any of a variety of known non-transitory tangible media for use with a data processing system, such as a diskette, hard drive, or CD-ROM. The code may be distributed on such media, or may be distributed to consumers from the memory or storage of one computer system over a network of some type to storage devices on other computer systems for use by consumers of such other systems.

Figure 1:
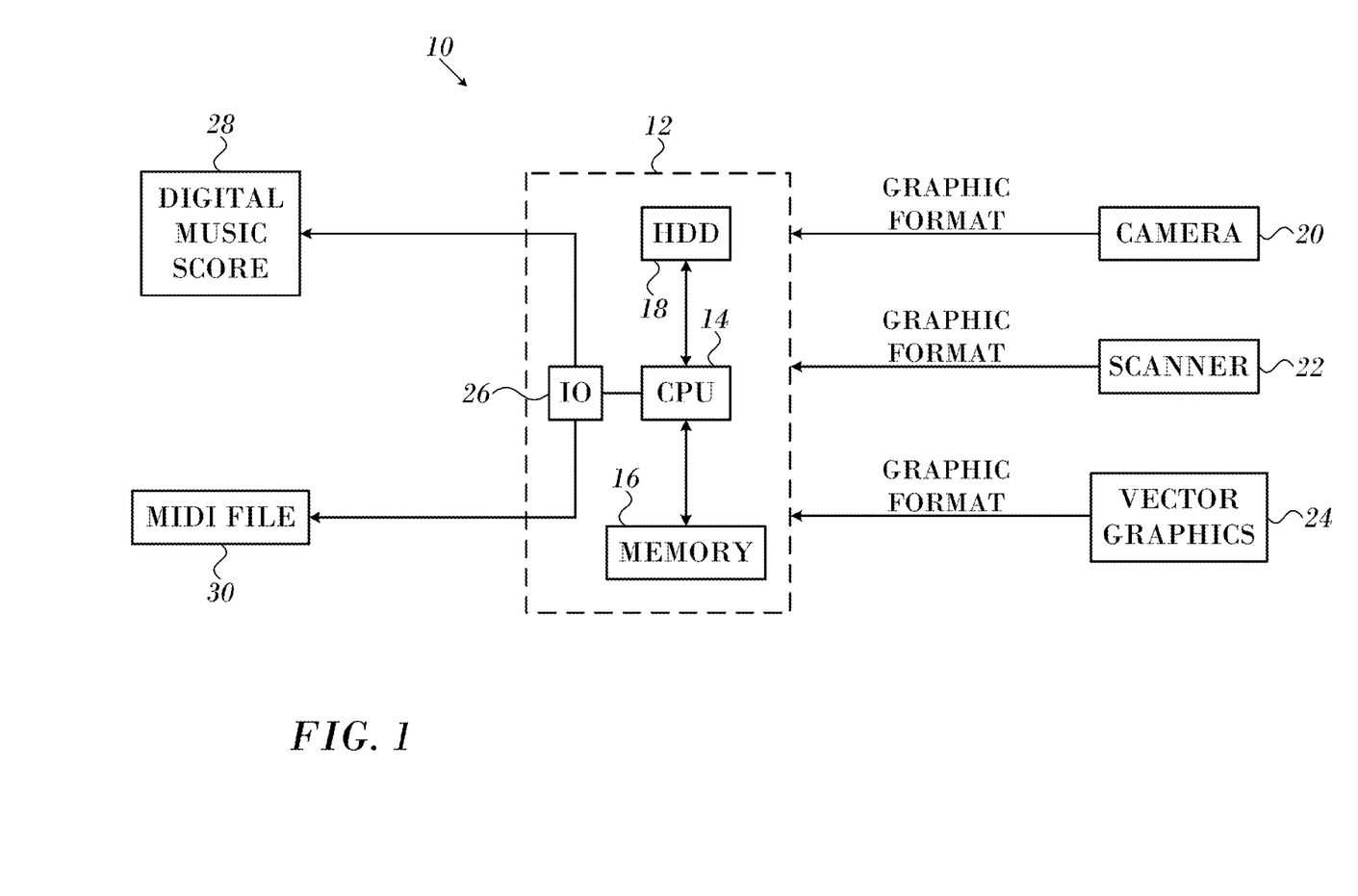
FIG. 1 is a block diagram of a system of music recognition, in accordance with an embodiment of the invention.

Turning now to the drawings, Reference is initially made to FIG. 1, which is a block diagram of a system 10 of music recognition, in accordance with an embodiment of the invention. The system 10 typically comprises a general purpose or embedded computer processor, which is programmed with suitable software for carrying out the functions described hereinbelow. These functions may be carried out in software running on a single processor, or on multiple processors. The software may be embodied on any of a variety of nontransitory media for use with a computer system, such as a diskette, or hard drive, or CD-ROM. The code may be distributed on such media, or may be distributed to the system 10 from the memory or storage of another computer system (not shown) over a network. Alternatively or additionally, the system 10 may comprise a digital signal processor or hardwired logic.

In the example of FIG. 1, a processing unit 12 includes a central processing unit 14 (CPU), a memory 16, and secondary storage unit 18, which can be a hard disk drive (HDD). The processing unit 12 receives input data according to a known graphic format from one or more optical input devices, examples of which are shown in FIG. 1 as a camera 20, optical scanner 22 and vector graphics module 24. The graphic formats for the optical input devices need not be the same.

The processing unit 12 processes the data in order to enhance the quality of the sheet music in a manner described in further detail below, and outputs a result via an I/O module 26. This may be a digital music score 28, e.g., a musicXML file or a MIDI (Musical Instrument Digital Interface) file 30.

Figures 2, 2A:
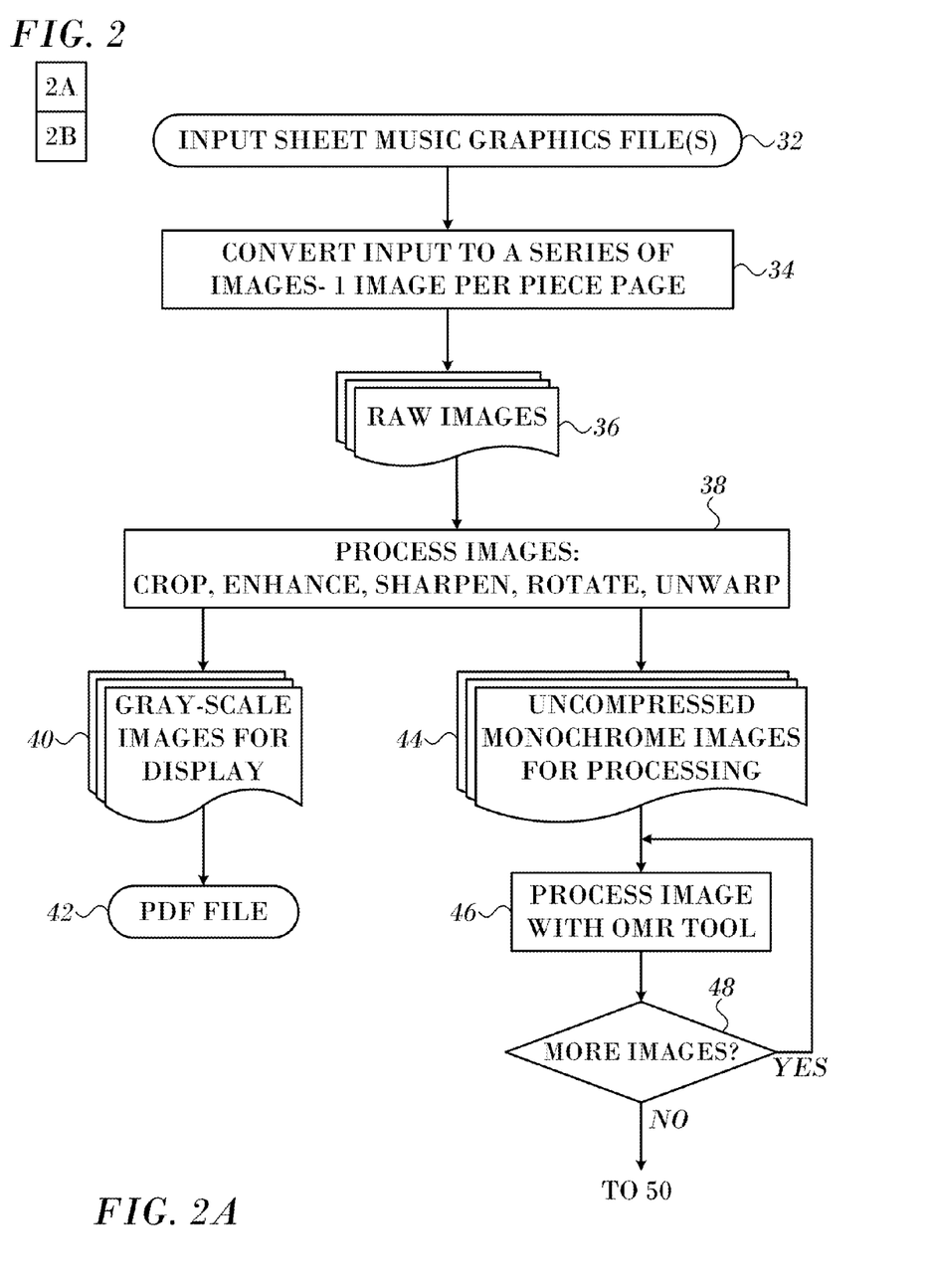
FIG. 2A and FIG. 2B, collectively referred to as FIG. 2, are flow-charts of a method for optical music recognition, in accordance with an embodiment of the invention.
Figure 2B:
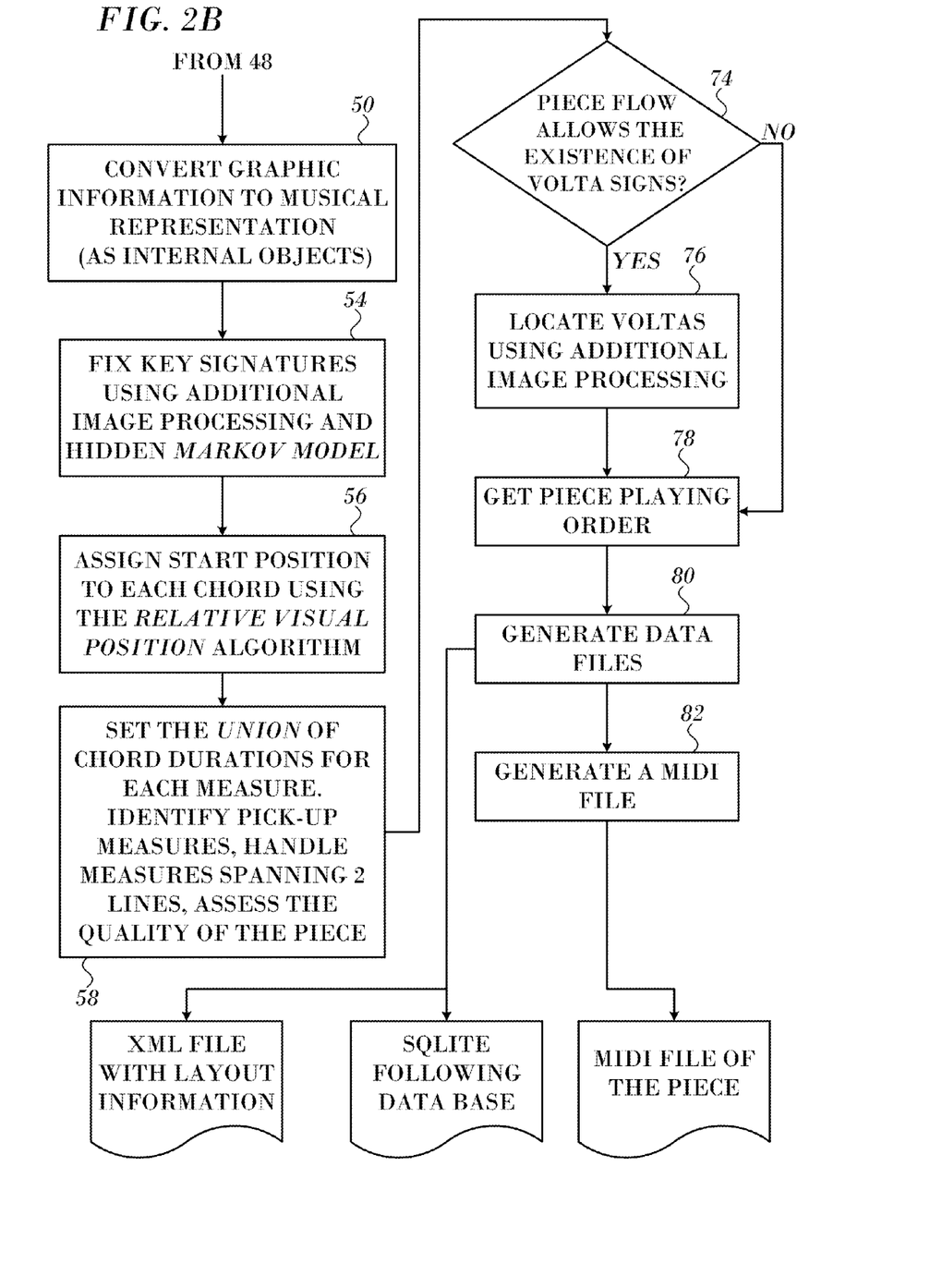

Reference is now made to FIG. 2A and FIG. 2B, collectively referred to as FIG. 2, which are flowcharts of a method for music recognition, in accordance with an embodiment of the invention. The process steps are shown in a particular linear sequence in FIG. 2 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the process.

At initial step 32, an image of sheet music is acquired by an optical device, e.g., camera 20 or scanner 22 (FIG. 1) and output to a processor as image data in a known graphic format. Alternatively, a pre-existing graphics file may be presented to the processor.

Next, at step 34 the data that was output at initial step 32 is formatted into a series of images, such that one image comprises one page of the sheet music. The result of step 34 is a series of raw digital images 36.

Next, at step 38, the raw images 36 are subjected to image processing steps, which may include in various combinations, cropping, deskewing, unwarping, sharpening, and other enhancements known in the image-processing art in order to achieve well-aligned and digital images that are as noise-free as possible.

Optionally the digital images produced in step 38 may be converted to gray-scale images 40. This may be accomplished in various ways, using conventional lossy or lossless techniques. At step 42, the gray-scale images may be output in a conventional graphical format suitable for viewing, for example as a PDF file 42.

Step 38 also comprises production of a series of uncompressed monochrome digital images 44, which are used for further digital processing at step 46. Step 46 comprises submission of the images 44 to an OMR tool, typically page-by-page of the sheet music. Many OMR tools are suitable, so long as they emit a digital output stream whose format is known.

Next, at decision step 48, it is determined if more images or pages remain to be processed. If the determination is affirmative, then control returns to step 46. Otherwise, control proceeds to step 50.

At step 50 the digital graphical format output by the OMR is converted to a composite musical data object 52 that models the original musical score. The actual conversion is specialized to the particular format of the OMR tool employed in step 46.

Figure 3:
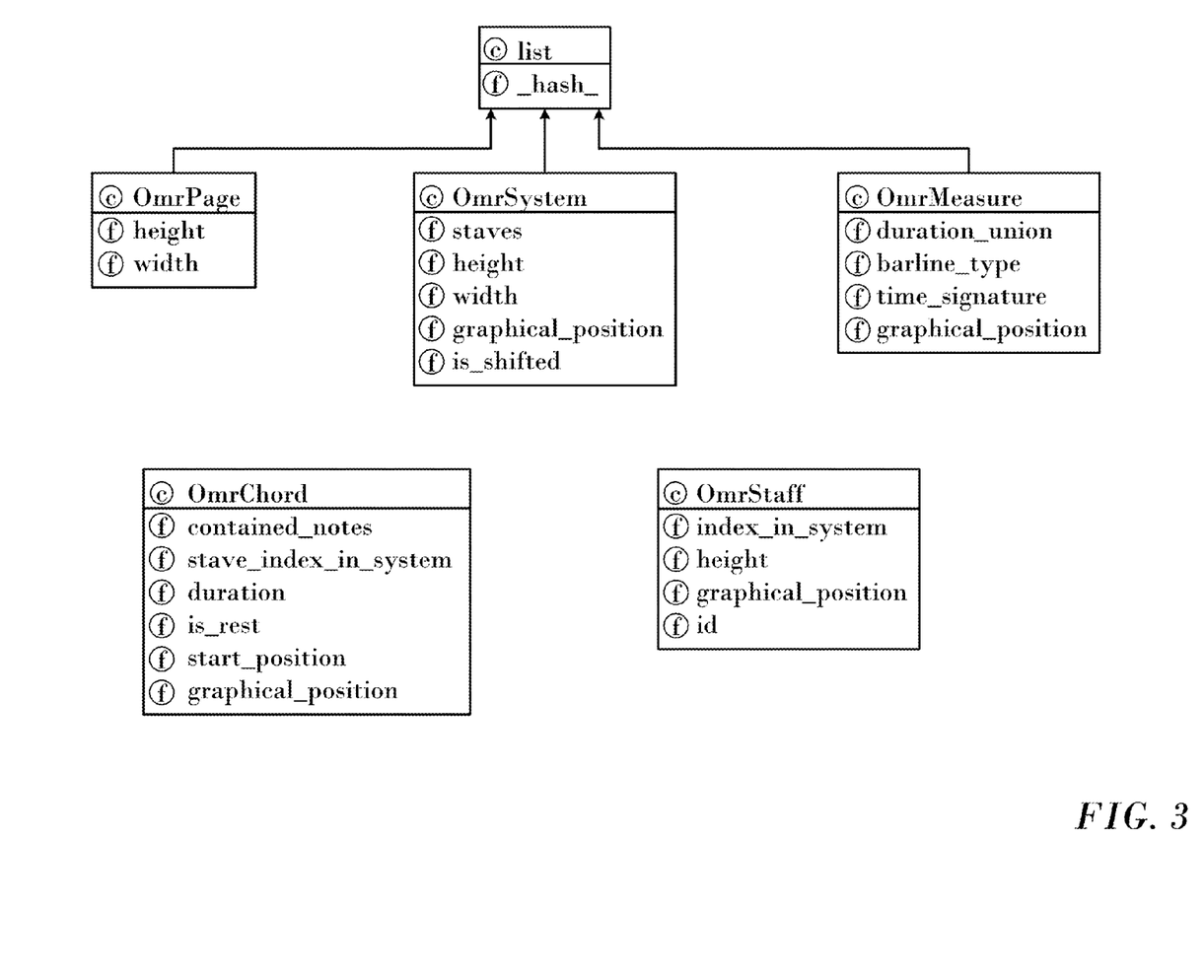
FIG. 3 is a class diagram that models the output of an OMR tool in accordance with an embodiment of the invention.

Reference is now made to FIG. 3, which is a class diagram that models the output of an OMR tool in accordance with an embodiment of the invention.

Figure 4:
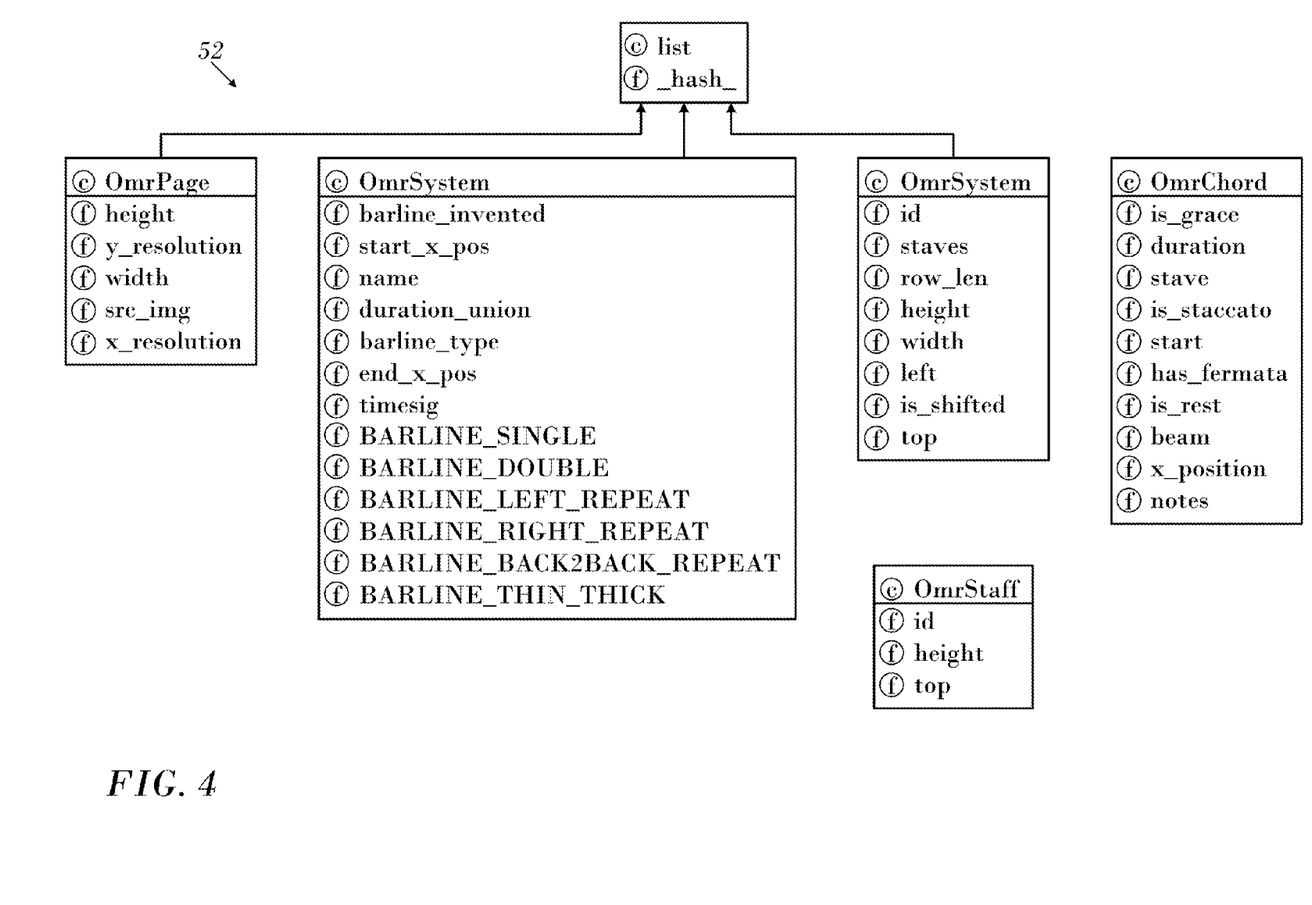
FIG. 4 is a class diagram that models a musical data object in accordance with an embodiment of the invention.

Reference is now made to FIG. 4, which is a class diagram that models the musical data object 52 in accordance with an embodiment of the invention. The properties of the musical data object 52 represent musical elements throughout the score, for example measures, notes and accidentals. These elements are identified and assigned position coordinates and other properties as shown in the class diagram in FIG. 4. The classes shown in FIG. 3 and FIG. 4 are used to implement step 50.

Conventional OMR tools often represent certain features of musical scores imperfectly: (1) identification of key signatures; and (2) anomalies in the score, e.g., failure to adhere to the stated meter in individual measures. These issues are dealt with in the following sections.

Key Signature Identification.

Returning to FIG. 2, a sequence of operations on the musical data object 52 begins at step 54. Step 54 comprises identification of regions of interest in the coordinate system containing presumptive key signatures.

In Western notation there are seven note names (from A to C, Do to Si), but there are twelve notes. All the "notes in between", those that appear on the piano keyboard as black keys, are designated by adding sharps (to signify the black key to the right of a white key) or flats (to signify the black key to the left of a white key) next to noteheads. Most pieces are written in keys in which certain sharps or flats appear regularly. Rather than indicating each accidental (the collective term for sharps, flats and naturals) separately, a composer would use in such a case a key signature. Repeating accidentals would be indicated together, without any noteheads adjacent, at the beginning of each staff, immediately following the clef.

There are several difficulties with OMR implementations in regard to the proper identification of key signatures. First of all, sharps and naturals look very similar. When dealing with low quality and/or low resolution scans, OMR implementations often confuse the two. Secondly, if the first note following a key signature has an accidental next to it, that accidental may be mistakenly considered as part of the key signature, These difficulties are overcome by embodiments of the invention as follows:

Presumptive key signature information obtained through the above-described identification is submitted to a hidden Markov model (HMM) in order to define the key signature more accurately. An HMM is a statistical model in which the system being modeled—in this case, the performance of a musical piece—is taken to be a Markov process with states that are not directly observable ("hidden"), but which give an observable output. A probabilistic analysis is applied to the observed output in order to infer the sequence of states traversed by the system, e.g., transitions in the score from one key to another. The HMM principally considers a count of flats and sharps as defining a key signature. Naturals are usually ignored.

Initial probabilities for each key signature in the score are submitted to the HMM. While the HMM is not highly sensitive to these probabilities, so long as they are relatively uniformly distributed, it operates more efficiently if these are reasonably accurate than if they are not. Initial probabilities for key signatures in a score may be obtained, for example, from a statistical review of the works of the composer of the current score, from compositions by other composers in the same category as the current score, or from the accumulated experience of scores previously analyzed by the user.

The present approach uses a two-dimensional state space to model the musical score, with coordinates that correspond to the locations of the musical elements in the score, more particularly, in regions of interest considered to contain key signatures. The electronic processor that carries out the computations calculates a probability distribution over the two-dimensional state space, based on three considerations that are detailed below. It uses this probability distribution in determining the most likely number of accidentals in regions having a key signature. In this application, the processing unit 12 (FIG. 1) executes the well-known forward-backward algorithm in the HMM in order to match the regions of interest in the musical score to the actual key signatures. Observable states correspond to observable number of accidentals in a region of interest. Hidden states correspond to the actual number of accidentals. The HMM reports the actual number of accidentals given the observed number.

Embodiments of the invention re-interpret the OMR analysis by applying musical logic to the image analysis. The following considerations are taken into account:

1. The initial key signature of the song or movement: the different possibilities of key signatures are taken into account, and factored statistically, in a very subtle manner—the fewer accidentals in the key signature, the more likely it is to be correct. This premise reflects historical tendencies in music composition. Additionally, the key signatures following that of the first staff are consulted, since key signature changes are not frequent.

2. Image analysis often returns different key signatures for different systems. (a system is a collection of staves that are supposed to be played simultaneously). Once again, a statistical premise helps here—it is far more likely for the key signature to remain the same, than it is for it to change. Once again, the key signatures of the surrounding systems are consulted.

3. It is extremely rare for different staves within the same system to have different key signatures. An exception to this rule is made, naturally, when one of the staves belongs to a transposing instrument such as the saxophone or the clarinet—such instruments always have different key signatures than the rest of the instruments, but then again—the relationship between the key signature of the transposing instrument and that of the other instruments remains always constant. These three premises are calculated through a hidden Markov model (HMM), and the results of the image analysis are corrected accordingly. The GHMM suite, available from Sourceforge, is suitable for the HMM. The HMM reports the most likely number and type of accidentals in each key signature of the score, recognizing the possibility that the key signature may change during the piece. The information provided by the HMM facilitates an understanding whether detected changes are real or not based on statistical analysis If the presumptive key signatures previously determined are found to be incorrect, then they are adjusted.

One suitable implementation of the HMM is shown in Listing 1.

Listing 1 define:
N=15 (number of possible key signatures)
k=number of stalls in a system
  states={−7, −6, . . . , 7}
  observations (emission domain)={0, 1, . . . , N^k}
  P(x0=i)—initial probabilities:
    Cb Gb Db Ab Eb Bb F C G D A E B F# C#
  prob=[21, 24, 25, 26, 27, 28, 29, 30, 29, 28, 27, 26, 25, 24, 22]
  return [x/sum(prob) for x in prob]
  P(xn+1=i/xn=j) for i,j in [0 . . . N−1]—transition probability matrix:
    This is a 15×15 matrix of 0.3 in the diagonal and (1−0.3)/14 in the rest.
  P(y=j/x=i) where j is the sampled value and i is the actual value.

emission probability matrix:

M is a N×N^k matrix where $M[i,(j1, \ldots, jk)]=P(y1=j1 \wedge \ldots \wedge yk=jk|x=i)=P(j1|i)* \ldots * P(jk|i)$.

$P(y=j|x=i)$ is defined as follows:
- set $\epsilon=0.05$
- if i=0, then if the sampled contains 1 or 2 signs, set result to $2\epsilon$ or $\epsilon$ respectively
- if the type of sign of i & j is the same, then result is P(j), Binomial(i, 0.88)
- else, set result to 0
- before returning, add $\epsilon$ to the result and normalize: $(res+\epsilon)/(1+N\epsilon)$ In order to convert index tuples to a single matrix coordinate, we convert it to base N.

The following is an example of a musical piece with one staff per system.

Assume we obtained the following sequence of accidentals from image-processing, where the numbers represent the number of sharp (#) signs found in each staff:

1, 0, 1, 1, 3, 1, 1, 1, 4, 4, 4, 4, 5, 4, 4.

Feeding this to the HMM results in the following sequence of fixed key signatures:

1, 1, 1, 1, 1, 1, 1, 1, 4, 4, 4, 4, 4, 4, 4

This result means that the HMM determined that numbers shown in bold case (positions 2, 5, 13) are image-processing mistakes:

1, 0, 1, 1, 3, 1, 1, 1, 4, 4, 4, 4, 5, 4, 4.

Figure 5:
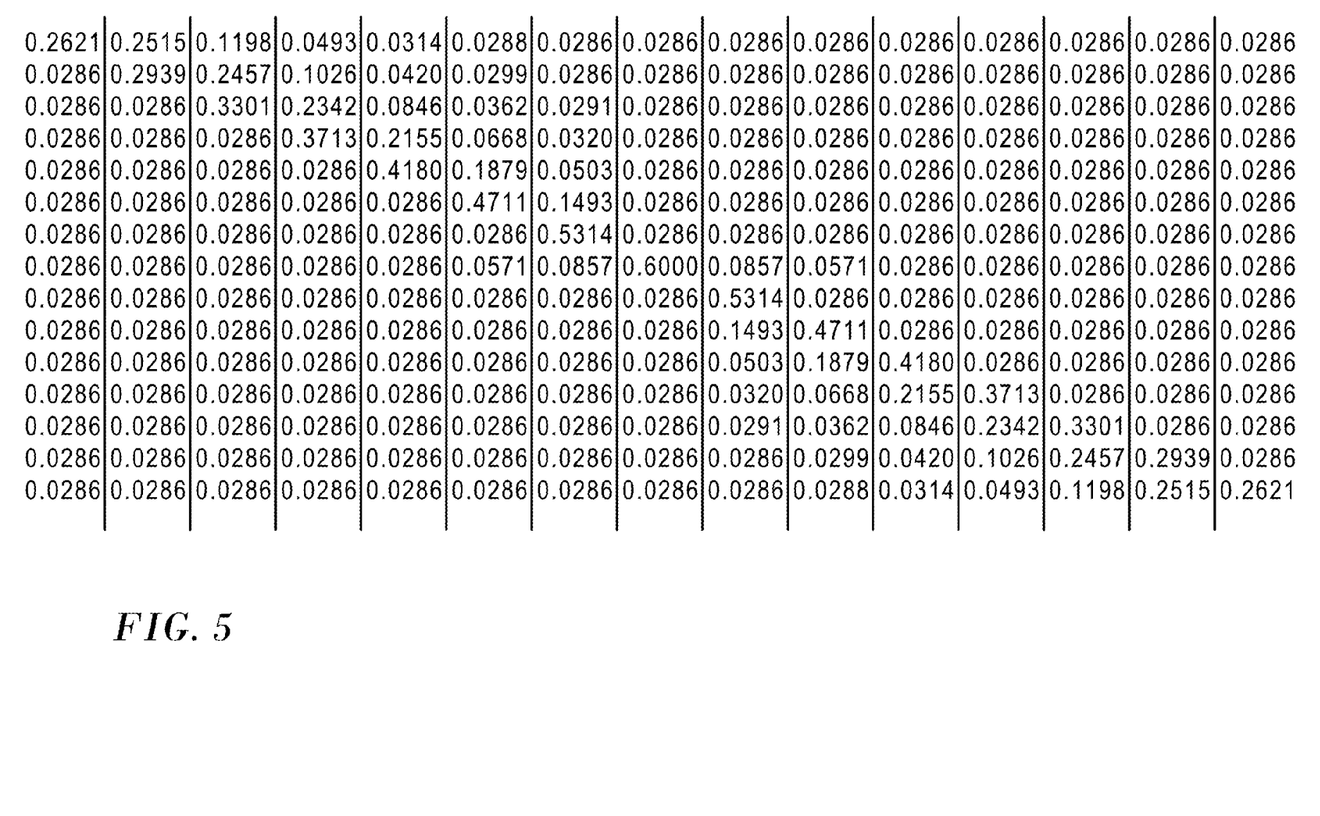
FIG. 5 is a table showing an emission matrix produced by a hidden Markov model in accordance with an embodiment of the invention.

Reference is now made to FIG. 5, which is a table showing the populated emission matrix of the HMM for the above sequence.

Rhythmic Anomalies.

The following discussion is offered to facilitate understanding of principles of the invention that deal with rhythmic anomalies. In Western notation, which is relevant to most Western classical and popular music, the rhythmic count is mostly regular. Songs and pieces are made of measures. Each one of these measures has a fixed number of beats that tends to remain constant throughout the song or the movement. The average listener intuitively discerns the measures and beats, because the first beat of each measure is perceived as more important rhythmically than the other beats, i.e., "The Strong Beat" of the measure. Thus one of the defining characteristics of a musical work is its meter—the length and number of beats per measure.

Figures 6, 7:
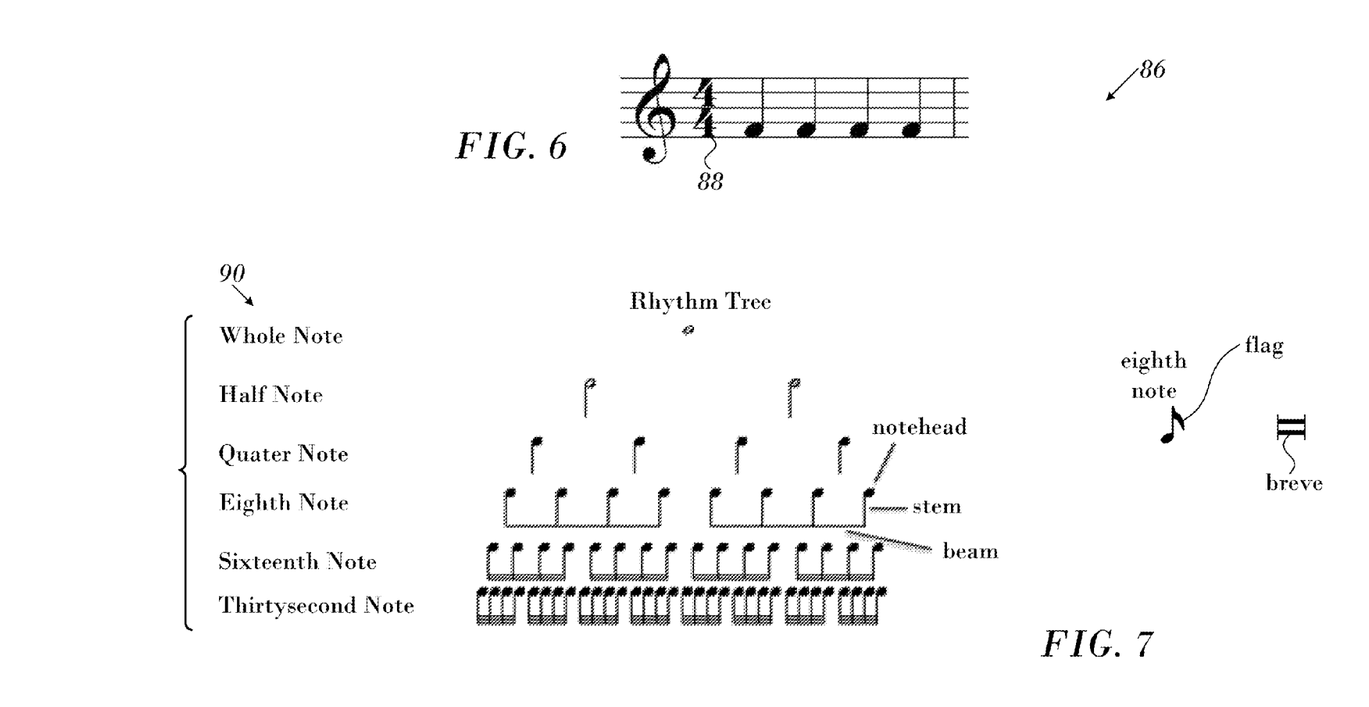
FIG. 6 is an example of musical notation in accordance with an embodiment of the invention.
FIG. 7 illustrates a rhythm tree that can be employed in accordance with an embodiment of the invention.

Reference is now made to FIG. 6, which shows an example of musical notation that is processed in accordance with an embodiment of the invention. Measure 86 is a four quarter-note measure in four-four meter, which is the most popular meter, also known as "common time". Meter indication 88 appears only at the beginning of each song or movement, and in places where the meter changes.

Reference is now made to FIG. 7, which illustrates a rhythm tree go that can be employed in accordance with an embodiment of the invention. The rhythmic value of each note in Western notation is determined by several graphic factors:

1. The notehead: can be rectangular (breve, aka double-whole-note) or circular (all shorter values). It can be hollow (breve, whole-note, half-note) or full (all shorter values).
2. The stem: whether it does not exist (breves, whole-notes) or does (all shorter values)
3. Beams/flags: these are interchangeable. Beams are used for groupings of notes shorter than quarter-notes. Flags are used for single, non-grouped notes of the same length. The number of beams/flags indicates the shortness of the rhythmic value: one for eighth-notes, two for sixteenth-notes, three for thirty-second-notes, etc.

Rhythm tree 90 illustrates several common rhythms. Notes in each level of the pyramid are twice as short as the higher level. A breve equals two whole notes. The tree shows the shapes of notes that are actually played. There is a corresponding pyramid of rests (not shown), which OMR implementations deal with in similar ways to those used with played notes.

Figure 8:
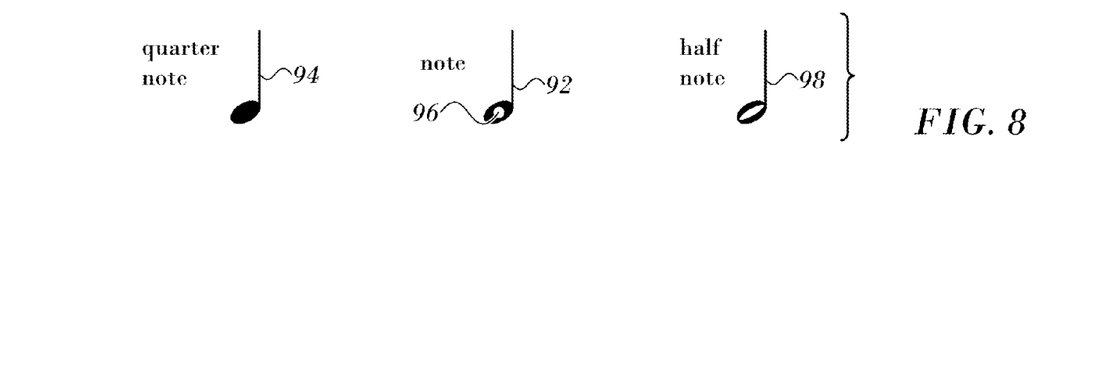
FIG. 8 is a diagram showing defective musical notation that is processed in accordance with an embodiment of the invention.

Reference is now made to FIG. 8, which a diagram that illustrates one difficulty in interpreting defective musical notation that is overcome by an embodiment of the invention. Conventional OMR implementations try to detect noteheads, stems, beams and flags in order to ascertain the rhythmic value of a given note. Faulty scanning, or blemishes in the print, can result in complete misdetection. For example a blemish in a note 92 could result in a misidentification. In this example, an original quarter note 94 was printed with a white region 96 inside its notehead. This may result in its detection as a half note 98. Consequently, the counting of the entire bar would be thrown off, since it will now appear to have, according to most OMR implementations, an extra quarter note. Needless to say, the note immediately following the note 92 will be presumed to start a quarter note later than its actual timing. The use of graphic placement, described below in further detail determines the starting time of the note following the blemished note 92 according to its graphic position in the measure. This allows the system to compensate for misdetection of the note 92. In other words, the note immediately following note 92 begins at a time that is determined without regard to the interpretation of the note 92. The use of graphic placement in this manner averages out complexities caused by multiple voices and imperfect optical scans and score reproductions.

Figure 9:
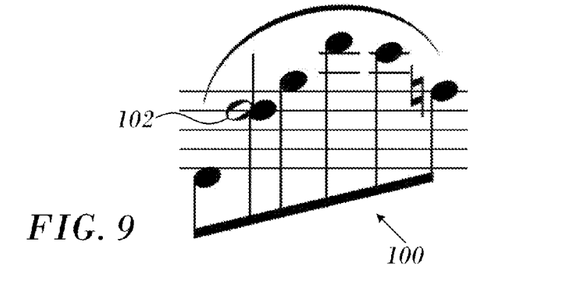
FIG. 9 is a diagram of complex musical notation which is interpreted by an embodiment of the invention.

Reference is now made to FIG. 9, which illustrates another difficulty in interpreting musical notation that is overcome by an embodiment of the invention. Composers sometimes disregard mathematical rhythmic notation conventions in favor of freedom, or expression. 19th century Polish-French composer Frederic Chopin gives us many examples of that sort. FIG. 9 is a passage 100 of a musical score taken from Chopin's Nocturne Op. 9 No. 1, measure 15, left hand part. We see that Chopin wrote two voices into one hand. Half note 102 written as the second note from the left is there in order to tell the performing pianist two things:

1. This note should be held longer than an eighth note.
2. This note should be emphasized.

However, the rhythmic value of the half note 102 makes no sense. It comes out of nowhere, and it ends an eighth note before the rest of the passage 100. Most OMR implementations, which try to reconcile the rhythmic value with the timing of the note within the measure, will report this as an error. In fact, in the Alfred edition of this piece, edited by Willard A. Palmer, the following comment was attached to this measure: "Chopin purposely placed the half note F on the 2nd 8th note of the group. Although this notation is not mathematically precise, the meaning is clear, and avoids unnecessary complications in notation."

Figure 10:
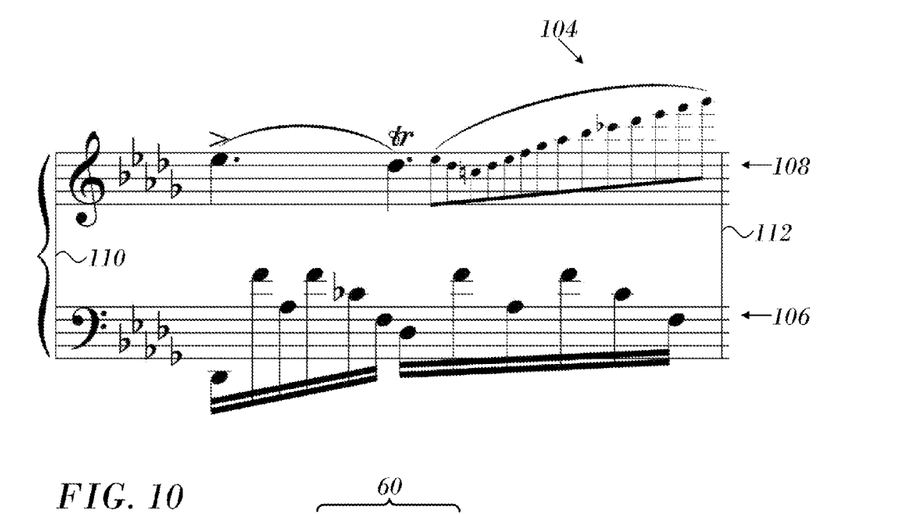
FIG. 10 is a diagram of complex musical notation which is interpreted by an embodiment of the invention.

Reference is now made to FIG. 10, which illustrates another difficulty in interpreting musical notation that is overcome by an embodiment of the invention. FIG. 10 is exemplary musical notation taken from Chopin's Nocturne Op. 27 No. 1, measure 51. In FIG. 10 we see that Chopin wrote a free, improvisation-like passage 104 for the right hand at the end of the measure. Pianists play these notes roughly against their graphical counterparts in left hand part 106. However, the notation Chopin chose for this passage is that of eighth-notes, and will be read as such by most OMR implementations, which will not know how to fit so many eighth-notes into one measure. To complicate things even further, right hand part 108 of this measure is completely full, rhythmically speaking, without even starting to count the improvisational passage 104. Sometimes composers add a number to such passages, in order to signify how many notes are to be fitted in the space of a given rhythmic value. However, editions also include other uses for numbers, such as fingerings, and conventional OMR implementations cannot differentiate between the different uses of such numbers. FIG. 10 demonstrates a fundamental paradigm of music printing that has existed since the early 19th century: the beginning of each note is set, graphically, in a location that corresponds to the timing in which it is supposed to be played. This means that the second note in the right hand part 108, which is supposed to be played exactly in the middle of the measure, is also graphically set at approximately half the distance between left barline 110 and right barline 112. Similarly, the left hand is supposed to play six notes against the first note of the right hand, and therefore this will also be shown graphically. It is this tradition of connection between the rhythmic counting and the graphic placement of notes that has given rise to freedoms such as those Chopin took. Chopin assumed performers will use the graphic layout when determining the right timing for their performance, and therefore he allowed himself to use mathematically incorrect rhythmic notation. Thus the use of graphic placement became an essential part of the way performers approach rhythm. For convenience elements such as the half note 102 and passage 104 that are inconsistent with rhythmic values of other musical elements in their respective measures are referred to herein as "anomalous rhythmic elements".

Existing OMR implementations determine the right timing for the beginning of each note by trying to count the value of each preceding note, and assigning the next note to be played once that value has been exhausted. It is understandable, then, that the limitations and errors described above will inevitably lead to fundamental distortions of counting. Nevertheless, the inventors have found that graphic adherence to rhythmic divisions is useful in determining the right timing for the beginning of each note: by measuring the note's graphic placement, i.e., its relative position between two barlines, we can establish a very close approximation to the right timing for its beginning. Embodiments of the invention exploit this paradigm, and the results are substantially more accurate than those of traditional OMR methods. Moreover, all of the difficulties described above are resolved, since the inventive OMR process imitates the way the performers treat rhythmic notation.

Start Time Assignments

As noted above, it is a common weakness of conventional OMR implementations that they fail to accommodate notational expressions that are inconsistent with the stated rhythmic values in a measure, and generate errors in instances of such cases. In order to deal with the possible rhythmic complexities, in an embodiment of the invention, a relative visual position algorithm exploits the relative position of a note between two bar lines to establish the correct timing for the beginning of the sound. In other words, the note or chord begins at a point in musical time (e.g., in beats) that is to the musical time interval of the measure as the graphical position of the note is to the graphical length of the measure. The algorithm can be expressed as the equation:

$$\frac{t_{note} - t_{start}}{t_{end} - t_{start}} = \frac{px_{note} - px_{start}}{px_{end} - px_{start}}, \quad (1)$$

where $t_{start}$ and $t_{end}$ are musical times at the beginning and end of a measure, respectively; $t_{note}$ is the musical time that a note or chord begins; $px_{start}$ and $px_{end}$ are graphical coordinates, e.g., pixels, which are obtained from the musical data object 52. The value $px_{start}$ is set at the first playable musical object (note or break) in a measure; $px_{end}$ is set at the ending bar line of the measure; and $px_{note}$ represents the graphical coordinates of the note or chord. In other words, the start times of anomalous rhythmic elements are assigned by ignoring the rhythmic values of other musical elements in the measure Returning to FIG. 2, at step 56, equation (1) is applied, treating the start position of each chord as a note.

Union of Durations.

Then, at step 58, the union of chord durations is determined for each measure.

Figure 11:
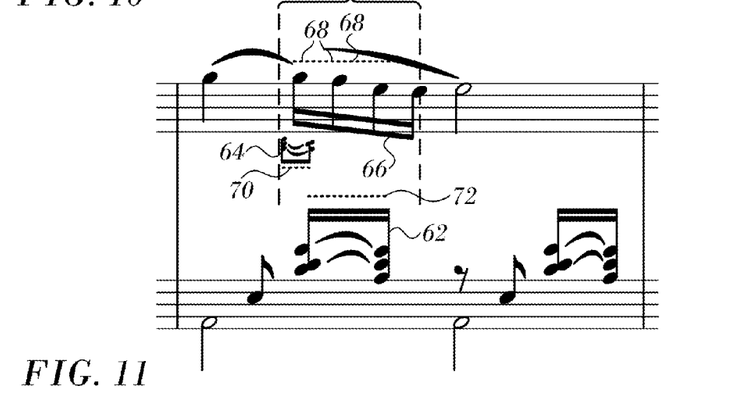
FIG. 11 is an exemplary measure illustrating the determination of a union of chord durations, in accordance with an embodiment of the invention.

Reference is now made to FIG. 11, which is an exemplary measure illustrating the determination of a union of chord durations, in accordance with an embodiment of the invention. An interval 60 represents the union of the intervals of chords 62, 64, 66. The respective chord intervals are represented by broken lines 68, 70, 72. The spatial intervals of each of the chords 62, 64, 66 overlap with one or more of the other chords 62, 64, 66. Exemplary applications of union measurements follow:

Identification of 2-line Measures.

Given measures m1 and m2 and respective durations (dur) and unions (un), the pseudocode in Listing 2 shows how to determine whether m1 and m2 represent the same measure or not:

Listing 2 set ϵ=0.3
if
|1−un(m1)/dur(m1)|<ϵ or |1−un(m2)/dur(m2)|<ϵ
assume they're 2 different measures.
else, if dur(m1)==dur(m2) and
|1−(un(m1)+un(m2))/dur(m1)|<ϵ
assume they're the same measure.
else, assume the quality is too bad and fail the process
In Listing 2 the function un( ) reports the sum of all chord unions in a measure.

Identification of Pick-up Measures.

If the union of a measure as defined above is too small (typically less than 0.8 of the measure's expected duration), then the measure is categorized as a candidate for a pick-up measure.

Quality Estimation.

If the union of a measure differs greatly than the known duration of the measure, (typically less than 0.8 or greater than 3 times the measure's expected duration) it is marked as a bad quality measure.

Referring again to FIG. 2, next, at decision step 74, it is determined if there may be volta signs in the current score.

If the determination at decision step 74 is affirmative, then control proceeds to step 76, where the volta signs are located, using additional image processing if necessary, as not all OMR tools report volta signs. Identifying volta signs improves the accuracy of the playing order in step 78.

After performing decision step 76, or if the determination at decision step 74 is negative, control proceeds to step 78, where the piece playing order is determined. The performance of this step is outside the scope of this disclosure and is therefore not discussed further.

Next at step 80 data files comprising digital music scores are generated from the musical data object 52. In one alternative, a MIDI file is produced at step 82, resulting in a MIDI file 84. Other examples of useful data files are XML files having layout information and additions to an Sqlite™ database. Data files in many other formats known to the art may be produced in step 80. Additionally or alternatively the generated output may be performed using known electronic music recognition methods.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of music recognition, comprising the steps of:
accepting a musical score of musical elements in a digital format, the musical elements comprising measures, key signatures, and first barlines and second barlines;
transforming the digital format into a composite musical data object that models the musical score, wherein the musical elements in the composite musical data object have coordinates;
defining the key signatures in the composite musical data object probabilistically;
computing start times to play musical elements in respective measures of the composite musical data object without regard to rhythmic values of other musical elements in the respective measure; and
generating an output comprising the defined key signatures and computed start times.

2. The method according to claim 1, wherein defining the key signatures in the composite musical data object is performed by submitting presumptive key signatures for computation in a hidden Markov model.

3. The method according to claim 1, wherein the hidden Markov model comprises:
an initial probability matrix populated by probabilities that the composite musical data object begins with a key; and
a transitional probability matrix populated by probabilities of a transition from one key to another key in the composite musical data object.

4. The method according to claim 1, wherein computing start times comprises the steps of:
identifying anomalous rhythmic elements in the respective measures of the composite musical data object that are inconsistent with the rhythmic values of the other musical elements therein; and
computing the start times of the anomalous rhythmic elements according to the coordinates of the anomalous rhythmic elements relative to the coordinates of the respective measures.

5. The method according to claim 1, wherein computing start times of one of the musical elements is performed using an equation $$\frac{t_{note} - t_{start}}{t_{end} - t_{start}} = \frac{px_{note} - px_{start}}{px_{end} - px_{start}},$$

where $t_{start}$ and $t_{end}$ are musical times at a beginning and end of a current measure, respectively; $t_{note}$ is the musical time that the one musical element begins; $px_{start}$ and $px_{end}$ are beginning and ending coordinates of the one musical element, respectively, and $px_{start}$ represents coordinates of a first playable musical object in the current measure.

6. The method according to claim 1, further comprising generating the digital format by optically scanning the musical score.

7. The method according to claim 1, wherein transforming the digital format into a composite musical data object comprises producing the musical score in a new digital format that is acceptable to a processor.

8. The method according to claim 1, wherein the musical elements comprise a plurality of chords having respective chord intervals and wherein computing start times comprises computing a union of the chord intervals.

9. The method according to claim 1, further comprising computing a union of a plurality of unions of chord intervals and determining whether the unions are within a single measure.

10. The method according to claim 1, further comprising the steps of:
making a determination that the union of the chord intervals in one of the measures is less than a predetermined proportion of an expected duration of the one measure; and
responsively to the determination reporting that the one measure is a candidate for a pick-up measure.

11. The method according to claim 1, further comprising the step of executing the output as a musical performance.

12. A computer software product for music recognition, including a non-transitory computer-readable storage medium in which computer program instructions are stored, which instructions, when executed by a computer, cause the computer to perform the steps of:
accepting a musical score of musical elements in a digital format, the musical elements comprising measures, key signatures, and first barlines and second barlines;
transforming the digital format into a composite musical data object that models the musical score, wherein the musical elements in the composite musical data object have coordinates;
defining the key signatures in the composite musical data object probabilistically;
computing start times to play musical elements in respective measures of the composite musical data object without regard to rhythmic values of other musical elements in the respective measure; and
generating an output comprising the defined key signatures and computed start times.

13. The computer software product according to claim 12, wherein defining the key signatures in the composite musical data object is performed by submitting presumptive key signatures for computation in a hidden Markov model, wherein the hidden Markov model comprises:
an initial probability matrix populated by probabilities that the composite musical data object begins with a key; and a transitional probability matrix populated by probabilities of a transition from one key to another key in the composite musical data object.

14. The computer software product according to claim 12, wherein computing start times comprises the steps of:
- identifying anomalous rhythmic elements in the respective measures of the composite musical data object that are inconsistent with the rhythmic values of the other musical elements therein; and
- computing the start times of the anomalous rhythmic elements according to the coordinates of the anomalous rhythmic elements relative to the coordinates of the respective measures.

15. The computer software product according to claim 12, wherein computing start times of one of the musical elements is performed using an equation $$\frac{t_{note} - t_{start}}{t_{end} - t_{start}} = \frac{px_{note} - px_{start}}{px_{end} - px_{start}},$$

where $t_{start}$ and $t_{end}$ are musical times at a beginning and end of a current measure, respectively; $t_{note}$ is the musical time that the one musical element begins; $px_{start}$ and $px_{end}$ are beginning and ending coordinates of the one musical element, respectively, and $px_{start}$ represents coordinates of a first playable musical object in the current measure.

16. The computer software product according to claim 12, wherein computing start times comprises the steps of identifying anomalous rhythmic elements in the respective measures of the composite musical data object that are inconsistent with the rhythmic values of the other musical elements therein and computing the start times of the anomalous rhythmic elements according to the coordinates of the anomalous rhythmic elements relative to the coordinates of the respective measures, and wherein defining the key signatures in the composite musical data object is performed by submitting presumptive key signatures for computation in the hidden Markov model.

17. The computer software product according to claim 12, wherein the musical elements comprise a plurality of chords having respective chord intervals and wherein computing start times comprises computing a union of the chord intervals.

18. The computer software product according to claim 12, further comprising computing a union of a plurality of unions of chord intervals and determining whether the unions are within a single measure.

19. The computer software product according to claim 12, further comprising the steps of:
- making a determination that the union of the chord intervals in one of the measures is less than a predetermined proportion of an expected duration of the one measure; and
- responsively to the determination reporting that the one measure is a candidate for a pick-up measure.

* * * * *